United States Patent [19]
McConnell et al.

[11] Patent Number: 5,703,294
[45] Date of Patent: Dec. 30, 1997

[54] METHOD OF EVALUATING THE VIBRATION CHARACTERISTICS OF A SPORTING IMPLEMENT SUCH AS A GOLF CLUB

[75] Inventors: Kenneth G. McConnell, Ames, Iowa; Guy M. Houser, Bainbridge Isl., Wash.

[73] Assignee: Iowa State University Research Foundation, Ames, Iowa

[21] Appl. No.: 578,167

[22] Filed: Dec. 29, 1995

[51] Int. Cl.$^6$ .................................................. A63B 53/00
[52] U.S. Cl. ............................ 73/579; 73/65.03; 473/221
[58] Field of Search ............................. 73/12.02, 65.03, 73/649, 12.04, 12.08, 12.12, 579, 583, 655; 473/219, 221, 222, 223, 233

[56] References Cited

U.S. PATENT DOCUMENTS

| | | | |
|---|---|---|---|
| 3,395,571 | 8/1968 | Murdoch | 73/579 |
| 3,941,380 | 3/1976 | Lacoste | 273/72 A |
| 4,523,759 | 6/1985 | Igarashi | 73/649 |
| 4,870,868 | 10/1989 | Gastgeb et al. | 73/649 |
| 5,379,641 | 1/1995 | Paassivaara et al. | 73/579 |
| 5,616,832 | 4/1997 | Nauck | 473/221 |

*Primary Examiner*—Ronald L. Biegel
*Attorney, Agent, or Firm*—James W. Miller

[57] ABSTRACT

A method of evaluating the vibration characteristics of a golf club comprises identifying the natural frequencies of vibration of the golf club through a pseudorandom vibrational excitation of the club. The club is then excited at least at some of the identified natural frequencies and the club head is observed under a strobe light to identify and locate on the face of the club head the node lines corresponding to the vibrational mode shape for these natural frequencies. The intersection pattern of the node lines as observed and mapped on the club face and the offset of this pattern from the presumed sweet spot provides important information as to the likely feel this particular golf club will have. In addition, a method of impacting a golf club at the sweet spot with a predetermined force is disclosed to simulate the impact of the club with a golf ball. The frequency response curve represented by the vibration levels as a function of frequency is a useful indicator of the gross or absolute levels of vibration of the club. Various golf clubs can be compared against one another by comparing the areas underneath the frequency response curves for the various clubs.

13 Claims, 4 Drawing Sheets

5,703,294

METHOD OF EVALUATING THE VIBRATION CHARACTERISTICS OF A SPORTING IMPLEMENT SUCH AS A GOLF CLUB

TECHNICAL FIELD

This invention relates to a method for evaluating the vibration characteristics of golf clubs to assess the feel of the club, namely why some clubs feel good and others do not when hitting a golf ball. More particularly, this invention relates to a method for locating the node lines for at least some of the club's vibrational modes on the club face. This invention also relates to a method for comparing the gross or absolute vibration levels of different clubs.

BACKGROUND OF THE INVENTION

A golf club designer or manufacturer desires to provide a golf club that feels good when the sweet spot on the club head impacts the ball. The sweet spot is some spot on the club face, generally a small circular spot in the center of the club face, which is the optimum spot for striking the golf ball. If the golfer swings the club in the proper arc and brings the sweet spot into engagement with the ball, then the ball should have its optimum and truest flight. As noted earlier, it is also desirable that when a club is so swung and struck, that it also feel good to the golfer.

A golf club that feels good when it is properly swung and struck is one in which there are no undesirable sensations imparted to the golfer's hands or arms. For example, if a club imparts a stinging sensation to the golfer's hands even when the club is properly swung and struck at the sweet spot, that club would be considered as having a bad feel and would be less desirable to the golfer. It is the absence of such undesirable sensations, or indeed the perceived absence of any sensations, that is manifested by a golf club with a good feel. When a club with a good feel is properly swung and struck, the club is not noticed at all by the golfer, simply becoming a natural extension of the golfer's arms and hands.

Existing golf clubs can be experimentally swung after they are manufactured to determine whether they have a good feel or a bad feel. A consensus might often be reached that one club has a good feel while another does not. However, there is little that is publicly known about why the first club has a good feel while the second does not. There has been little published work that can be utilized to better understand the factors that influence the feel of a golf club.

SUMMARY OF THIS INVENTION

One aspect of this invention is to provide a method of evaluating the vibration characteristics of a golf club to help provide information as to the likely feel of such a golf club to a user.

This aspect of the invention comprises a method used in conjunction with a golf club that includes a shaft having a club head at one end with the club head including a club face that is designed to impact with a golf ball. The method comprises identifying at least some of the natural frequencies of vibration of the golf club, and then locating relative to the face of the club head the node lines for the natural frequencies so identified.

Another aspect of this invention is to provide a method of evaluating the vibration characteristics of a golf club to provide information as to the gross or absolute levels of vibration of the club.

This aspect of the invention again comprises a method used in conjunction with a golf club that includes a shaft having a club head at one end with the club head including a club face that is designed to impact with a golf ball. The method comprises impacting a first golf club at the club face with a predetermined force in a manner that is representative of impact of a golf ball with the golf club, and then measuring vibration levels occurring at the club face as a result of the predetermined force impact with such levels being plotted along a vertical axis as a function of increasing frequency of vibration which is plotted along a horizontal axis. This plot defines a frequency response curve with the area between the curve and the horizontal axis being representative of the absolute amount of vibration occurring at the first golf club for the predetermined force impact.

BRIEF DESCRIPTION OF THE DRAWINGS

This invention will be described more completely in the following Detailed Description, when taken in conjunction with the following drawings, in which like reference numerals refer to like elements throughout.

DETAILED DESCRIPTION

The Applicants have discovered that the performance and feel of a golf club strongly depend on its vibration characteristics. Both the head and shaft are important in obtaining a good feeling club. This invention comprises a method of evaluating the vibration characteristics of a golf club to derive certain information, such as the location of certain vibrational node lines on the club face as well as the gross or absolute levels of club face vibration. This information allows the user to more objectively determine the likely feel of a particular club, to compare one golf club with another, to improve the club's design, etc.

The Applicants have discovered that the vibrations felt by the golfer's hands when hitting the ball come from two major sources of motion of the club head. The head's vibrational motion is a combination of linear and angular vibrational motion caused as a natural consequence of club head impact with the ball. Linear vibrational motion of the head is that vibrational motion in a direction perpendicular to the longitudinal axis of the shaft. Angular vibrational motion is that vibrational motion about an axis parallel to the longitudinal axis of the shaft.

Linear and angular vibrational motion occur simultaneously following impact of the club head with the golf ball. Both types of motion contribute to the overall vibration of the club head and shaft and, consequently, to the feel imparted by the golf club to the golfer's hands. This invention provides important information for the design of golf clubs derived from knowledge of the angular and linear vibration occurring on the club head.

Figure 1:
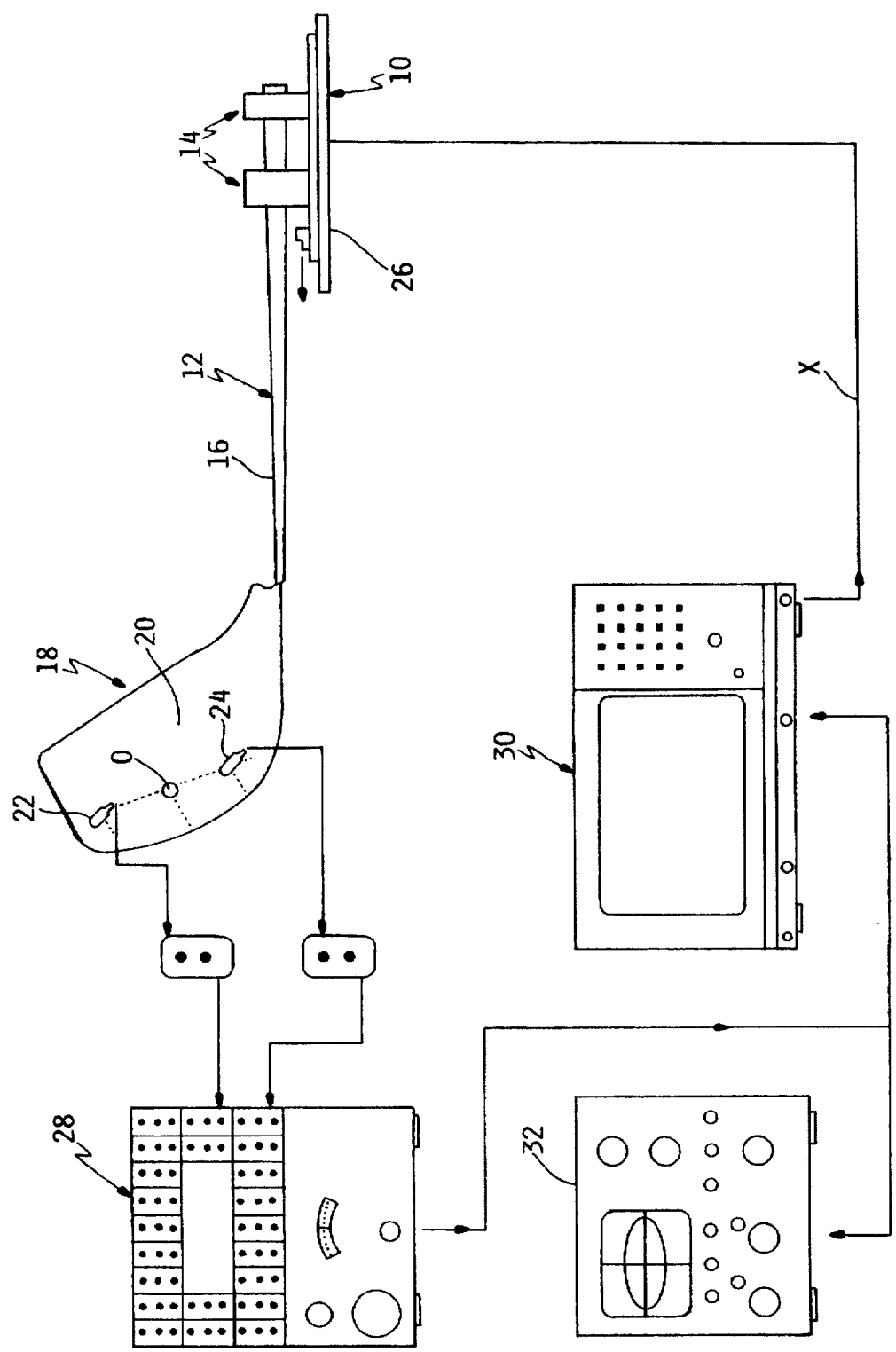
FIG. 1 is a diagrammatic view of a measurement system for making frequency response function (FRF) measurements used in the methods of this invention of evaluating the vibration characteristics of golf clubs.

In practicing the methods of this invention, the measurement system shown in FIG. 1. is used to make frequency response function (FRF) measurements. In this measurement system, a conventional vibration exciter table 10 provides excitation motion to a golf club 12. As shown in FIG. 1, golf club 12 is attached to exciter table 10 by a special fixture 14 connected to the grip end of the shaft 16 of golf club 12. Fixture 14 is itself mounted on exciter table 10 such that motion of exciter table 10 is transferred into similar motion of golf club 12. Golf club 12 extends away from its attachment to fixture 14 in a cantilevered manner such that the head 18 of golf club 12 is not directly supported but is free to move both linearly and angularly.

For the purpose of clarity, head 18 of golf club 12 is shown enlarged in FIG. 1 in comparison to the illustration of shaft 16 of golf club 12. In reality, the size of head 18 would be proportional to the size of shaft 16 in keeping with the usual proportions of such components in a golf club 12. Moreover, golf club 12 will normally be oriented in fixture 14 so that the club face 20, i.e. the substantially planar front face of head 18, is horizontal and faces upwardly. Club face 20 has been shown in FIG. 1 as being rotated 90° from this horizontal position to be vertical, again for the purpose of clarity in illustrating the invention. The presumed sweet spot of club head 18 is illustrated by the point 0 on club face 20.

Two conventional accelerometers 22, 24 are used to measure the response signal coming from the vibration of head 18. These two head accelerometers 22, 24 are directly affixed to club face 20 of head 18 generally equidistant from and on either side of sweet spot 0, i.e. offset 1 inch from sweet spot 0 on either side thereof. See FIG. 1. A third table accelerometer 26 is mounted on exciter table 10 in order to measure the input motion to golf club 12. An analog computer 28 receives the signals from all of the accelerometers 22, 24, and 26 to thus obtain and determine the linear and angular motions of head 18 to determine the corresponding linear and angular FRF's. A signal proportional to the linear motion of head 18 is obtained by adding the signals from head accelerometers 22, 24 while a signal proportional to the angular motion of head 18 is obtained by subtracting the same signals.

Analog computer 28 is only one means that can be used to add and subtract the signals from head accelerometers 22, 24 to obtain the linear and angular motions of head 18. The same thing can be done with operational amplifiers which actually are used in analog computer 28. In addition, the same thing can be done by recording the two acceleration signals by means of an analog to digital converter, and by then adding and subtracting the signals digitally before doing frequency analysis. The important point is the measurement of two accelration signals from the head and the adding and subtracting of these signals to separate the linear motion from the angular motion of club head 18.

One aspect of this invention is to identify the location of the node lines for at least some of the major vibrational modes of golf club 12 on club face 20. This identification includes visually mapping or displaying the node lines on club face 20. This is done in the following manner.

With golf club 12 mounted on exciter table 10 in the manner shown in FIG. 1, a first test is performed using pseudorandom excitation. This test covers a given frequency range in order to locate the club's natural frequencies of vibration. A pseudorandom signal is generated by a frequency analyzer 30, such as a Type 2032 B&K Analyzer, and sent to exciter table 10. This signal, identified as X in FIG. 1, produces a periodic but random appearing motion of exciter table 10 and fixture 14 that is able to excite golf club 12 over a broad band of frequencies. Alternatively, other broad band excitation signals may be used to drive exciter table 10, such as random, impact or chirp excitation signals. Frequency analyzer 30 will analyze the test results from this first test to identify and record those frequencies which comprise the natural frequencies of vibration for the particular golf club 12 installed on exciter table 10. An oscilloscope 32 can be connected to computer 28 to visually display the club head motion being recorded by frequency analyzer 30.

Following this pseudorandom excitation test, a sinusoidal test can be performed to develop useful information concerning the node lines when golf club 12 is vibrating at one or more of its natural frequencies. A node line is any line on or a portion of the club which is relatively still or stationary during vibration at a given natural frequency. In particular, this aspect of this invention is concerned with mapping or displaying such node lines as they appear on or cross club face 20.

In performing the sinusoidal test, exciter table 10 is employed again. Club 12 is excited by frequency analyzer 30 at the natural frequencies identified by the pseudorandom test or by another suitable means or test. The sinusoidal test is performed in order to produce the resulting club motion by exciting it at each natural frequency so identified. When excited at a given natural frequency, club 12 vibrates at its corresponding mode shape for that frequency.

By shining a strobe light (not shown) at club face 20 during vibration at the natural frequency, the node line, if one exists, can actually be seen on club face 20 as that line which is relatively stationary. It is then possible to map or mark this node line on club face 20 or to otherwise record its location. For example, the node line can be marked simply by drawing it onto club face 20 with a marker or by marking it in some other fashion. The Applicants have discovered that the node lines are very important because they reveal the true position of sweet spot 0 for a given golf club 12 and how that true position might differ from the supposed or presumed position of sweet spot 0.

Some of the node lines will occur at or near club face 20 and thus are relatively easy to mark on club face 20. Other node lines are lines that will pass internally through club head 18 but not directly appear on club face 20. For such other node lines that pass internally through club head 18, these lines are actually projected onto club face 20 for the purpose of the disclosed node line analysis of this invention. This is done by observing the points on the other surfaces of club head 18 that are stationary, e.g. a stationary point on the top face of club head 18 and another stationary point on the bottom face of club head 18, by connecting such points with a line, and by then normally projecting this line onto club face 20. This method of line projection is permissible since it is the line of action of the impact force from the golf ball relative to such node lines that is important whether such node lines are at or near club face 20 or pass internally through club head 18.

Figure 2A:
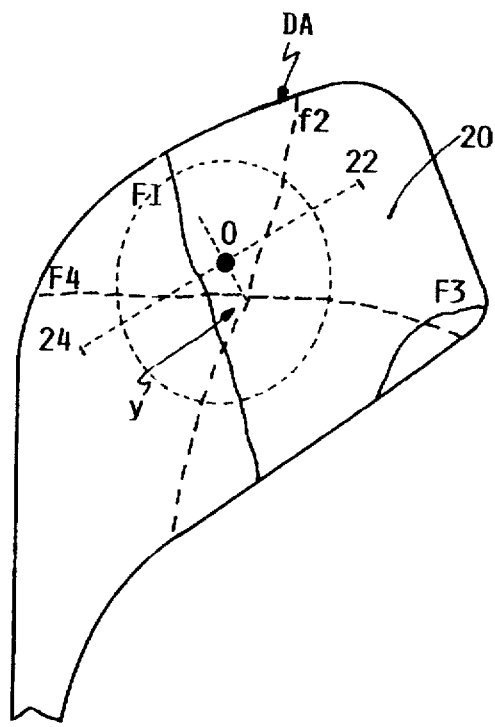
FIGS. 2A and 2B are elevational views of the club faces of two different but similar types of golf clubs, namely two different drivers, in which the node lines for various vibrational modes have been displayed or mapped on the face of the club head in relation to each other and to the presumed sweet spot of the club.
Figure 2B:
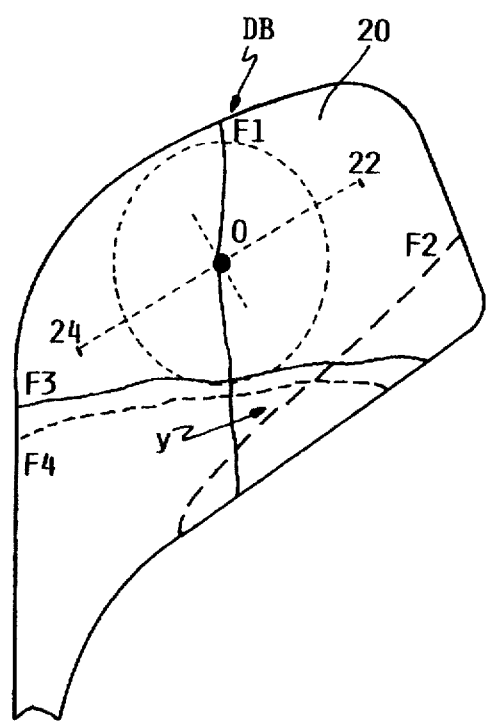

The node line results for two types of clubs are shown in FIG. 2 using the above methodology, i.e. a pseudorandom excitation to identify the natural frequencies of club 12 followed by excitation of club 12 at the major natural frequencies with mapping of the node lines on club face 20. FIG. 2A shows the node lines F1–F4 for a first driver DA excited at its natural frequencies of F1=54.7 hz, F2=74 hz, F3=168 hz, and F4=336 hz. FIG. 2B shows the node lines F1–F4 for a second driver DB, i.e. a driver other than the first driver DA, excited at its natural frequencies of F1=42 hz, F2=60 hz, F3=152 hz, and F4=309 hz.

By analyzing and comparing the two node line mappings contained on FIGS. 2A and 2B, various useful information is provided. First, we see a region on face 20 of club 12 for which the node lines corresponding to frequencies F1, F2, and F4 intersect forming a closed region of triangular shape for each club. This closed region of triangular shape is identified as Y in FIGS. 2A and 2B. Secondly, the first driver DA has a smaller triangular area Y compared to the area Y of second driver DB. Finally, the triangular area Y for the first driver DA is closer to the presumed sweet spot 0 than for driver DB.

From this information alone, it is possible to conclude that the first driver DA will be superior to the second driver DB in terms of dynamic performance since most of its node lines intersect in a smaller triangular area Y closer to the presumed sweet spot 0 than for driver DB. Hence, when the ball impacts driver DA's head 20 at a point close to the presumed sweet point 0, little vibration from the natural frequencies will be transmitted to the golfer's hands due to the fact that head 18 is being impacted at a point close to the intersection of most node lines. Accordingly, we can say that driver DA's true sweet spot location is very close to the presumed sweet spot 0 and that this club will be considered to be a club with a good feel.

The same conclusions do not apply for driver DB since the triangular area Y formed by the intersection of the node lines is located further from the presumed sweet spot 0. In this case, even if face 20 of club head 18 strikes the ball at a point close to the presumed sweet spot 0, considerably larger amounts of vibration will be transmitted to the golfer's hands since the node line configuration illustrates a true sweet spot that occupies the upper part of face 20 of club head 18. This explains the fact that some clubs when impacted at sweet spot 0 impart a very bad feeling to the golfer's hands. If the second driver DB is impacted at sweet spot 0, the golfer will experience a lot of vibration from vibration of club head 18 at its natural frequencies.

Figure 3A:
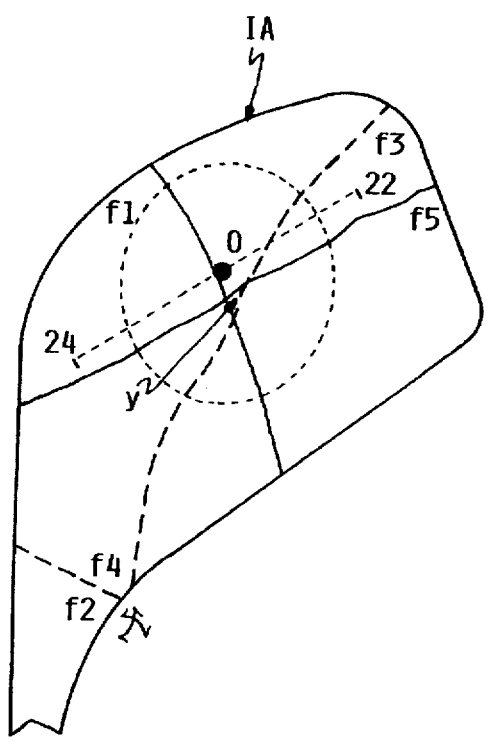
FIGS. 3A and 3B are elevational views of the club faces of two different but similar types of golf clubs, namely two different irons, in which the node lines for various vibrational modes have been displayed or mapped on the face of the club head in relation to each other and to the presumed sweet spot of the club.
Figure 3B:
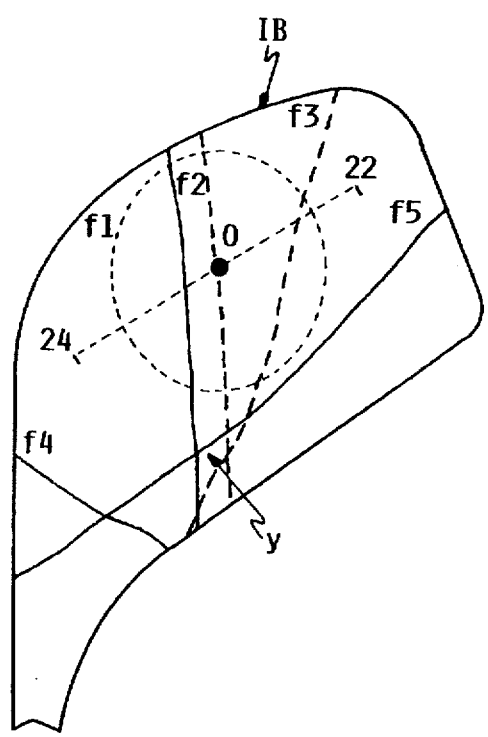

The same comments above for drivers DA and DB apply to irons IA and IB shown in FIGS. 3A and 3B. In this case, five major natural frequencies are identified for each club as follows, iron IA: F1=49.03 hz, F2=70.03 hz, F3=116.35 hz, F4=211.96 hz, and F5=325.82 hz; and iron IB: F1=59.81 hz, F2=69.21 hz, F3=105.81 hz, F4=197.19 hz, and F5=289.73 hz. Again, these natural frequencies were determined by means of pseudorandom excitation of golf club 12. Thereafter, each club was excited at each of these major natural frequencies to map the node line configuration on club face 20.

For iron IA, the node lines corresponding to frequencies F1, F3 and F5 define a triangular area Y that is very close to the presumed sweet spot 0. For iron IB, the location of these same node lines do not follow the same trend as for iron IA. For iron IB, the node line triangular area Y defines a true sweet spot much closer to the upper part of club face 20 than to the presumed sweet spot 0. Thus, by employing the same logic as for the drivers, it is possible to conclude that iron IA, presenting a node line intersection that is well defined and is far closer to presumed sweet spot 0 than that obtained for iron IB, will be much superior to iron IB in terms of dynamic performance.

The advantages of practicing this aspect of the invention should be apparent. For example, it allows various golf clubs to be tested to determine which will have a good feel, i.e. a relatively small or tight node line intersection pattern having a relatively small triangular area Y close to the presumed sweet spot, and which will not, i.e. a larger node line intersection pattern having a larger triangular area Y that is more widely displaced from the presumed sweet spot. This can be determined objectively in a precise and repeatable fashion without having to rely upon the subjective evaluations of various golfers. Accordingly, golf clubs which do not have desirable node line intersection patterns can be easily identified.

Another use for the node line information is to allow the manufacturer to adjust the design of golf club 12 to better group the node line intersection pattern around or close to the presumed sweet spot. This would be done by adjusting various elements of the shaft and head design including their weight distribution.

The sinusoidal test described above and the node line mapping made possible as a result reveal the location of the node lines relative to the presumed sweet spot 0. However, this test does not directly measure the gross or absolute levels of vibration produced by golf club 12 when the ball strikes sweet spot 0. Accordingly, another aspect of this invention is to provide a method for measuring such levels and of comparing the effectiveness of one club to resist vibration when the ball strikes sweet spot 0. The figure of merit (FOM) is designed to compare two competing clubs under identical test conditions.

Referring first to FIG. 4, an impact test can be performed in the laboratory to simulate the impact of a golf ball striking sweet spot 0 of golf club 12. In this test, golf club 12 is mounted in fixture 14 and the two head accelerometers 22, 24 are attached as shown in FIG. 1. The presumed sweet spot 0 is clearly marked and a small bead, such as an air rifle BB, is attached to sweet spot 0 by using bee's wax. An impact hammer (not shown) is then used to impact against the bead attached to sweet spot 0 to provide an impact force against club head 18.

After the impact is delivered to club head 18 by the impact hammer, it is possible to record and store FRF's for both linear and angular motion of head 18 over a range of frequencies. The linear FRF is computed and stored first. In this case, computer 28 is set to add the signals from head accelerometers 22, 24 and the linear FRF is computed by frequency analyzer 30 as the ratio of this signal to the input force recorded from the hammer's force transducer. Secondly, the signals from head accelerometers 22, 24 are subtracted and the angular FRF is similarly computed.

Figure 4A:
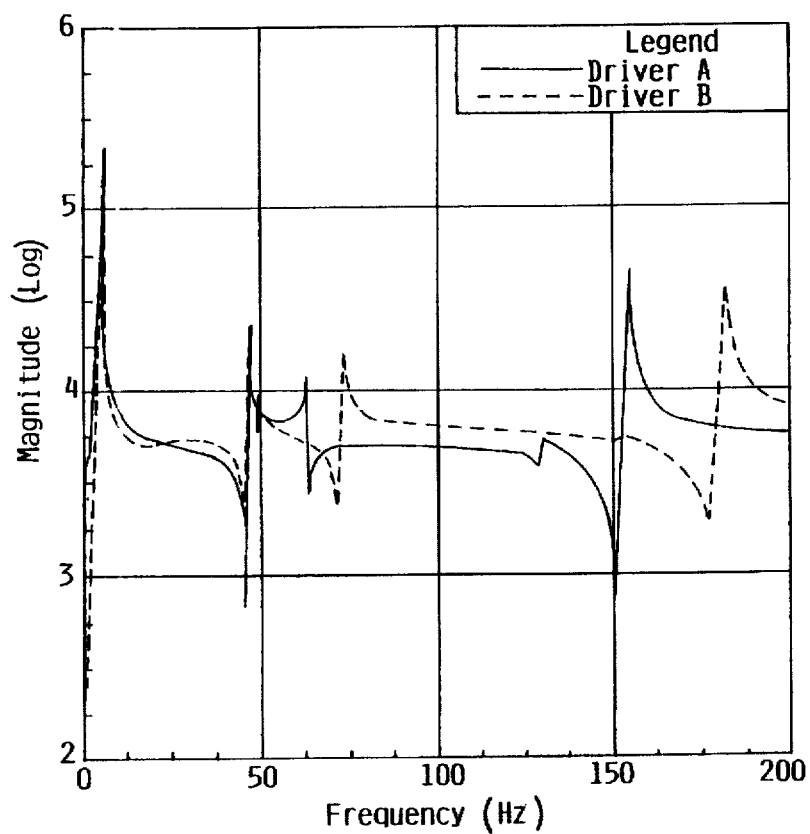
FIG. 4A is a linear frequency response function (FRF) measurement for two different but similar types of golf clubs, namely two different drivers.
Figure 4B:
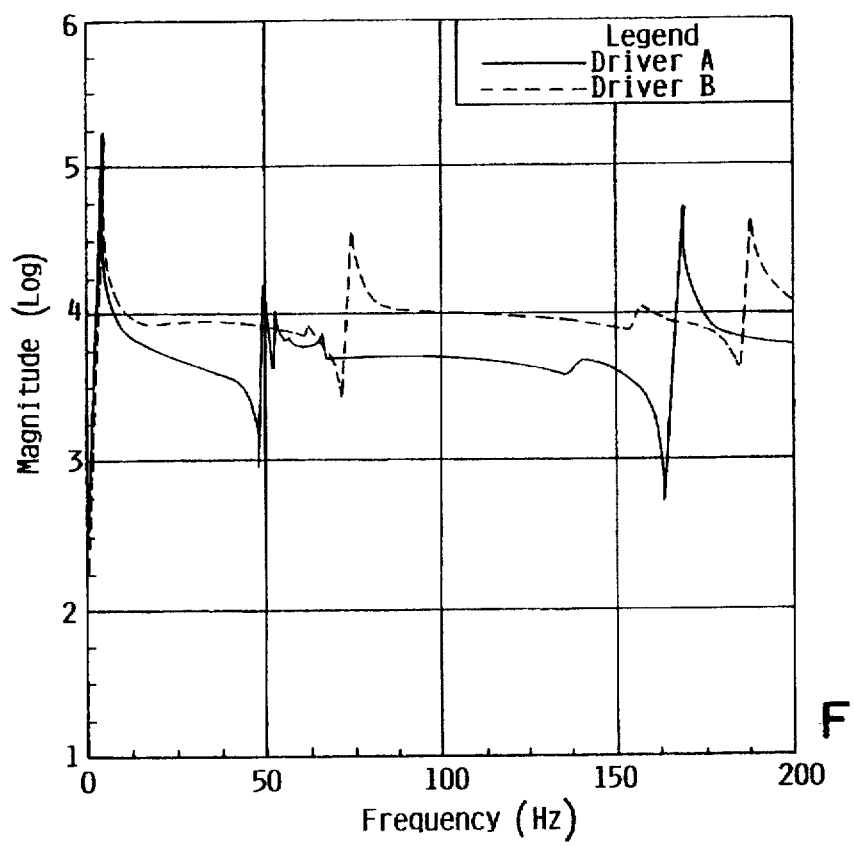
FIG. 4B is an angular frequency response function (FRF) measurement for two different but similar types of golf clubs, namely two different drivers.

Typical impact FRF's are shown in FIG. 4. FIG. 4A shows the linear FRF's for two drivers for impact at sweet spot 0. FIG. 4B shows the angular FRF's for the same clubs at the same impact position.

Figure 5:
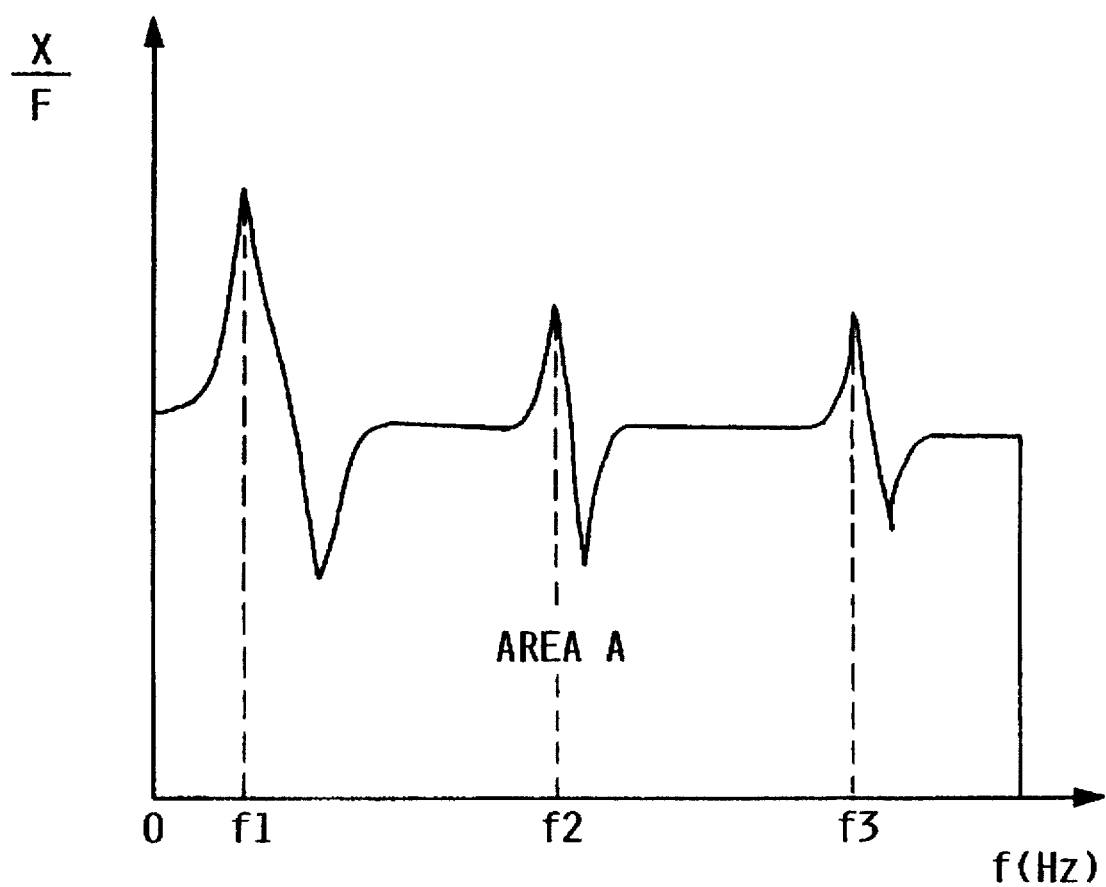
FIG. 5 is a graph of the gross or absolute vibrational levels of a golf club, either linear or angular vibrational levels, as a function of frequency, with the area beneath the curve being used in one of the methods of this invention as a means for comparing one club against another.

Consider the FRF shown in FIG. 5, which could be either a linear or an angular FRF derived for a particular golf club using the impact test described above. The area A between the FRF curve and the frequency axis is a measure of the gross or absolute vibration levels which result when club head 18 is impacted at its sweet spot 0 by the instrumented hammer. As is well known in the art, the parameter X being graphed per unit of force F in the FRF of FIG. 5 typically comprises the amptitude or displacement of the vibration in a measure known as receptance, but can also comprises velocity in a measure known as mobility, or acceleration in a measure known as accelerance.

Now, if a first golf club is known to be a very good feeling club, (called the reference club), and another club (called the comparison club) is to be evaluated relative to the reference club, the FOM is defined as the ratio of The areas A over a given frequency range, so that $$FOM = \frac{A_{comparison}}{A_{reference}}$$

This equation tells us how well the comparison club compares to the reference club over the frequency range of interest. This comparison can be interpreted as follows.

FOM is less than unity (FOM<1.0)

This result indicates that the total area under the FRF curve for the comparison club is less than the area for the reference club. This means that the comparison club has lower absolute vibration levels than the reference club and is thus superior.

FOM is equal to unity (FOM=1.0)

This result indicates that both clubs present the same vibration levels.

FOM is greater than unity (FOM>1.0)

In this case, the comparison club has higher absolute vibration levels when compared to the reference club. Thus, the comparison club will perform worse than the reference club.

The FOM represents an important parameter when comparing two clubs in terms of their overall or absolute vibration levels. However, a golf club having a FOM less than unity is not guaranteed to be a good feeling club. A good feeling club also needs to have the node line intersection pattern defined by the triangular area Y concentrated near sweet spot 0.

The Applicants have discovered that angular vibrational motion is more important to club feel than linear vibrational motion. Hence, it is concluded that a low FOM for such angular motion is more important to have a good feeling club than a low FOM for linear motion, although both would obviously be desirable.

In practicing the node line intersection mapping described above with respect to FIGS. 1 and 2, each club will exhibit a first linear mode or fundamental mode of vibration that is close to 0 hz frequency. This mode can be ignored in the above-described method of node line mapping since the node lines of the higher order levels of vibration are most important in determining the feel of club 12. Thus, node line mapping should occur for the natural frequencies of vibration of all modes of vibration other than for the first linear mode with such mapping occurring for at least the second linear mode of vibration and for at least the first angular mode of vibration. Preferably, enough node lines will be mapped, e.g. the first three to five node lines for the vibrational modes following the fundamental mode of vibration, to allow a triangular node line intersection area Y to be found and located relative to the presumed sweet spot.

While the disclosed methods of vibrational analysis of golf clubs are useful in determining the feel of the club, these methods are also useful predictors of the power transmission characteristics of golf clubs. For example, a club in which the node line intersection area Y is widely offset or dispersed from the presumed sweet spot, or a club in which the area Y is itself very large, will exhibit a loss in power output, i.e. the ball will travel a shorter distance for a given impact at the presumed sweet spot Y. This occurs since at least some of the energy being applied to the club and available for propelling the ball is being diverted into the production of vibration about the node lines. Thus, conversely, when the triangular node line intersection area Y is small and located very close to the presumed sweet spot and the ball is then struck at the sweet spot, little vibration is produced, giving the club a good feel, and the power transmitted to the ball is at or close to the maximum, contributing to a longer flight of the ball and providing the club with good power transmission characteristics.

Various modifications of this invention will be apparent to those skilled in the art. Accordingly, this invention is to be limited only by the appended claims.

We claim:

1. A method of evaluating the vibration characteristics of a sporting implement, wherein the sporting implement includes a shaft having a hitting member with the hitting member including a hitting face that is designed to impact with and propel an object, which comprises:
   (a) identifying a plurality of the natural frequencies of vibration of the sporting implement which frequencies produce node lines on the hitting member; and
   (b) locating relative to the face of the hitting member the node lines present on the hitting member for the natural frequencies identified in step (a).

2. The method of claim 1, wherein the natural frequencies for at least one linear and one angular mode of vibration are identified in step (a).

3. The method of claim 1, wherein the natural frequencies for a plurality of linear and a plurality of angular modes of vibration are identified in step (a) such that the natural frequencies of a first linear mode, a second linear mode, a first angular mode, a second angular mode, and so on, are identified, and wherein step (b) is performed for the natural frequencies of at least the second linear mode of vibration and the first angular mode of vibration.

4. The method of claim 1, wherein step (b) is performed for a sufficient number of natural frequencies to allow a triangular area formed by the intersection of at least three node lines to be identified on the hitting face.

5. The method of claim 1, wherein step (a) comprises:
   (i) mounting the sporting implement on a vibrational exciting means in a fashion such that the hitting member is not directly supported but is free to move both linearly and angularly;
   (ii) causing the vibrational exciting means to vibrate over a relatively broad band of frequencies to cause corresponding vibrational motion in the sporting implement;
   (iii) identifying those frequencies within the band of step (ii) at which peak levels of vibration occur on the sporting implement; and
   (iv) recording the frequencies identified in step (iii) as the natural frequencies of vibration of the sporting implement.

6. The method of claim 1, wherein step (b) comprises:
   (i) exciting the sporting implement at one natural frequency chosen from the natural frequencies identified in step (a);

(ii) shining a strobe light at the hitting member as the sporting implement is excited at the one natural frequency and vibrates in its characteristic mode shape for the one natural frequency;

(iii) observing the hitting member under the strobe light to determine a relatively stationary line on the hitting member or passing through the hitting member and where such line or a projection of such line crosses the hitting face which line comprises the node line for vibration of the sporting implement at the chosen natural frequency; and (iv) repeating steps (i)–(iii) for each of the natural frequencies identified in step (a).

7. The method of claim 1, wherein the spotting implement is a golf club and the hitting member comprises a club head at one end of the shaft.

8. A method of evaluating the vibration characteristics of a sporting implement, wherein the sporting implement includes a shaft having a hitting member with the hitting member including a hitting face that is designed to impact with and propel an object, which comprises:

(a) identifying the natural frequencies for various modes of vibration of the sporting implement including at least a first linear mode, a second linear mode, and a first angular mode;

(b) identifying the presence and location of node lines for at least the second linear mode and the first angular mode of vibration on the hitting member; and (c) wherein step (b) is performed for a sufficient number of natural frequencies to allow a triangular area formed by the intersection of at least three node lines on the hitting member to be identified on the hitting face.

9. The method of claim 8, wherein the sporting implement is a golf club and the hitting member comprises a club head at one end of the shaft.

10. A method of evaluating the vibration characteristics of a sporting implement, wherein the sporting implement includes a shaft having a hitting member with the hitting member including a hitting face that is designed to impact with and propel an object, which comprises:

(a) impacting a first sporting implement at the hitting face with a predetermined force in a manner that is representative of impact of the object with the sporting implement; and (b) measuring a parameter indicative of vibration levels occurring at the hitting face as a result of the predetermined force impact of step (a) with such parameter per unit of force being plotted along a vertical axis as a function of increasing frequency of vibration which is plotted along a horizontal axis, such plot defining a frequency response curve with the area between the curve and the horizontal axis being representative of the absolute amount of vibration occurring at the first sporting implement for the predetermined force impact.

11. The method of claim 9, further including the additional steps of:

(c) repeating steps (a) and (b) for a second sporting implement with impact being at the same predetermined force as was used with respect to the first sporting implement; and (d) comparing the vibration levels of the second sporting implement relative to the first sporting implement by comparing the areas under the corresponding frequency response curves for both sporting implements.

12. The method of claim 10, wherein the sporting implement is a gold club and the hitting member comprises a club head at one end of the shaft.

13. The method of claim 12, wherein the first golf club is a club in which a triangular area formed by the intersection of at least three node lines for vibration at three natural frequencies of the club is relatively close to the sweet spot.

* * * * *